United States Patent [19]

Hamada et al.

[11] Patent Number: 5,028,122
[45] Date of Patent: Jul. 2, 1991

[54] LIQUID CRYSTAL ACTIVE-MATRIX DISPLAY DEVICE

[75] Inventors: Hiroshi Hamada; Tadanori Hishida, both of Nara; Ikuo Sakono, Osaka, all of Japan

[73] Assignee: Sharp Kabushiki Kaisha, Osaka, Japan

[21] Appl. No.: 340,777

[22] Filed: Apr. 20, 1989

[30] Foreign Application Priority Data

Apr. 20, 1988 [JP] Japan ................................. 63-98536

[51] Int. Cl.⁵ .......................... G02F 1/13; G09G 3/02
[52] U.S. Cl. .................................. 350/333; 350/334; 350/339 R; 340/719
[58] Field of Search .......... 350/336, 333, 334, 339 R; 340/784, 719; 357/4

[56] References Cited

U.S. PATENT DOCUMENTS

| | | | |
|---|---|---|---|
| 3,824,003 | 7/1974 | Koda et al. | 350/333 |
| 4,431,271 | 2/1984 | Okubo | 350/334 |
| 4,534,623 | 8/1985 | Araki | 350/339 R |
| 4,778,258 | 10/1988 | Parks et al. | 350/333 X |
| 4,810,060 | 3/1989 | Ukai | 350/333 |
| 4,820,024 | 4/1989 | Nishiura | 350/333 |

FOREIGN PATENT DOCUMENTS 62-10619 1/1987 Japan ................................. 350/333
62-66666 3/1987 Japan ................................. 350/333

OTHER PUBLICATIONS

"Promise and Challenge of Thin-Film Silicon Approaches to Active Matrices", Conference Record of 1982 International Display Research Conference, Cherry Hill, N.J., 19th–21st Oct., 1982, pp. 146–151.
"A 640×400 CdSe TFT-LC Display Panel", Sid International Symbosium, Digest of Technical Papers, 1st Edition, May 1985, pp. 286–188.

*Primary Examiner*—Stanley D. Miller
*Assistant Examiner*—Huy K. Mai

[57] ABSTRACT

A liquid crystal active-matrix display device is disclosed in which the edge portion of each of the gate electrodes overlaps the edge portion of each of the picture element electrodes to form an additional capacitor. The gate electrodes are made of tantalum, and a first insulating film of tantalum pentoxide and a second insulating film of silicon nitride are disposed in a gap between each of the gate electrodes and each of the picture element electrodes. This thereby provides additional capacitors with a large capacity at a high yield, with little affect on other processes.

15 Claims, 3 Drawing Sheets

LIQUID CRYSTAL ACTIVE-MATRIX DISPLAY DEVICE

BACKGROUND OF THE INVENTION

1. Field of the Invention

The present invention relates to a liquid crystal active-matrix display device which has thin film transistors (hereinafter referred to as TFTs) as addressing devices for controlling the transmittance of picture elements. More particularly, it relates to a liquid crystal active-matrix display device which has, as addressing devices, reverse stagger type TFTs whose semiconducting film is made of amorphous silicon (a-Si).

2. Description of the Prior Art

FIGS. 3a and 3b show a conventional liquid crystal active-matrix display device in which reverse stagger type TFTs are used as addressing devices. This liquid crystal display device comprises a pair of cell substrates 120 facing each other and a liquid crystal layer 103 sealed in the gap between the pair of cell substrates 120. One of the two cell substrates 120 comprises an insulating substrate 101, gate electrodes 102, a gate insulating film 105, an a-Si (amorphous silicon) semiconducting film 106, an insulting film 107, an n+-a-Si (n+-amorphous silicon) contact film 108 for ohmic contact, source and drain electrodes 109, picture element electrodes 110 for display, and a protective film 111. The picture element electrodes 110 are arranged in a matrix format. An additional capacity electrode Cs parallel to the liquid crystal capacity is formed to improve picture element potential-retaining characteristics and to minimize the shift in the picture element electrode potential level at the time of the fall of the gate driving pulse resulting from the capacity between the gate electrode 102 and the drain electrode 109 (Proc. Japan Display '83, p.412 (1983) and Proc. Euro Display '84, p.145 (1984)). The additional capacity electrode Cs is obtained by forming transparent conducting film in two layers on the insulating substrate 101 with the extension of the gate insulating film 105 between the two layers for isolation from each other. The first layer of the conducting film server as a ground electrode 112 and the second layer serves as the picture element electrode 110, as shown in FIG. 3b.

In the above-mentioned conventional liquid crystal display device, as mentioned above, the ground electrode 112 for providing the additional capacity Cs is made of transparent conducting film, so that the resistance of the ground electrode 112 for additional capacity Cs becomes high. This causes insufficient performance or a cross talk among the picture electrodes. The resistance of the ground electrode 112 for additional capacity Cs could be reduced by increasing the thickness or width of the ground electrode 112. However, the greater film thickness would result in a greater difference in level between the ground electrode 112 and the insulting substrate 101, which results in an increase in defects of step coverage of the gate insulating film 105 and other films on the ground electrode 112. The defects of step coverage would increase a short circuit between the ground electrode 112 and the picture element electrode 110 and increase the chance of breakage of the source electrode and other elements of each TFT to be formed in the later process. The greater electrode width would result in the higher probability of a short circuit between the ground electrode 112 for additional capacity Cs and the picture element electrode 110, and between the ground electrode 112 and the source electrode 109. It would also result in a larger capacity between the ground electrode 112 for additional capacity Cs and the source electrode 109 thus causing the cross talk in signals and a large load on the source driver.

In addition, the thicker or wider ground electrode 112 for additional capacity Cs, would involve a larger number of manufacturing processes, which is not favorable.

SUMMARY OF THE INVENTION

The liquid crystal active-matrix display device of the present invention, overcomes the above-discussed and numerous other disadvantages and deficiencies of the prior art. It is directed toward a liquid crystal active-matrix display device including thin film transistors that switch picture elements and picture element electrodes that are arranged into a matrix. The picture element electrodes are connected to the thin film transistors and the thin film transistors are disposed at intersecting points that are formed by gate electrodes and source electrodes which are perpendicular to each other are disposed on the gate electrodes and have drain electrodes connected to the picture element electrodes.

Further, the edge portion of each of the gate electrodes overlaps the edge portion of each of the picture element electrodes to form an additional capacitor. The gate electrodes are made of tantalum, a first insulating film of tantalum pentoxide and a second insulating film of silicon nitride are disposed between each of the gate electrodes and each of the picture element electrodes.

In a preferred embodiment, each of the gate electrodes includes a gate line that extends from each of the gate electrodes in such a manner that it is positioned to overlap the periphery of the corresponding picture element electrode.

In a preferred embodiment, the gate electrodes function as additional-capacitor electrodes.

In a preferred embodiment, the first insulating film is formed by oxidizing the surface of each of the gate electrodes.

In a preferred embodiment, the second insulating film is formed by plasma chemical vapor deposition.

Thus, the invention described herein makes the following objections possible: (1) providing a liquid crystal active-matrix display device in which electrodes for providing additional capacity Cs are formed without increasing the number of film forming and etching processes; (2) providing a liquid crystal active-matrix display device in which additional capacitors with a large capacity are formed at a high yield with little affect on other processes, because of the use of insulating films made of tantalum pentoxide with a high dielectric constant, even though the surface areas of the electrodes for providing the additional capacity Cs are small; and (3) providing a liquid crystal active-matrix display device in which the additional capacitors improve the picture element potential-retaining characteristics and reduce the shift in the picture element electrode potential level at the time of the fall of the gate driving pulse resulting from the capacity between the gate electrodes and the drain electrodes.

BRIEF DESCRIPTION OF THE DRAWINGS

This invention may be better understood and its numerous objects and advantages will become apparent to those skilled in the art by reference to the accompanying drawings as follows:

FIG. 3b is a sectional view showing a part of the conventional display device shown in FIG. 3a.

DESCRIPTION OF THE PREFERRED EMBODIMENTS

EXAMPLE

Figure 2:
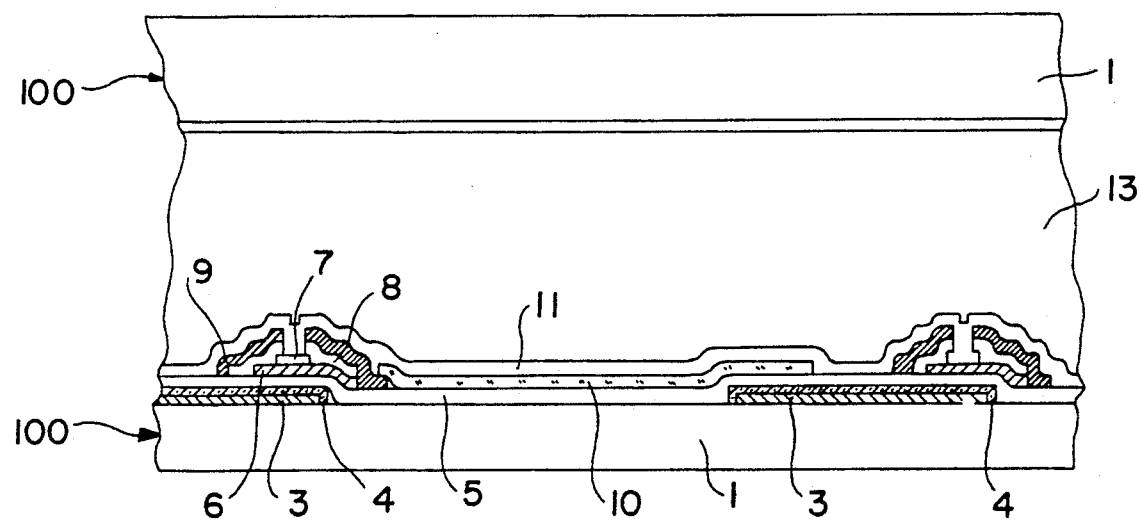
FIG. 2 is a sectional view showing the display device taken along line X-Y of FIG. 1c.
Figure 3A:
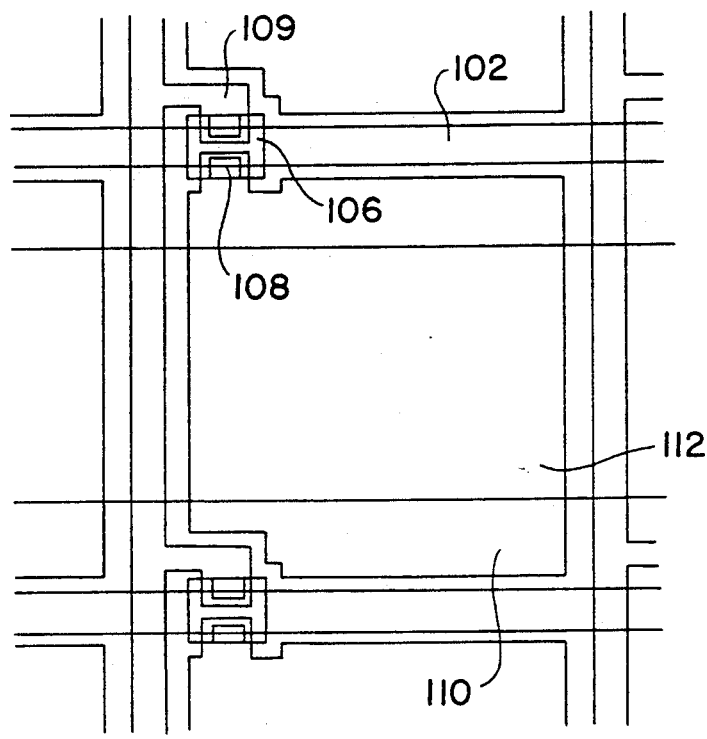
FIG. 3a is a plane view showing a conventional liquid crystal active-matrix display device.
Figure 3B:
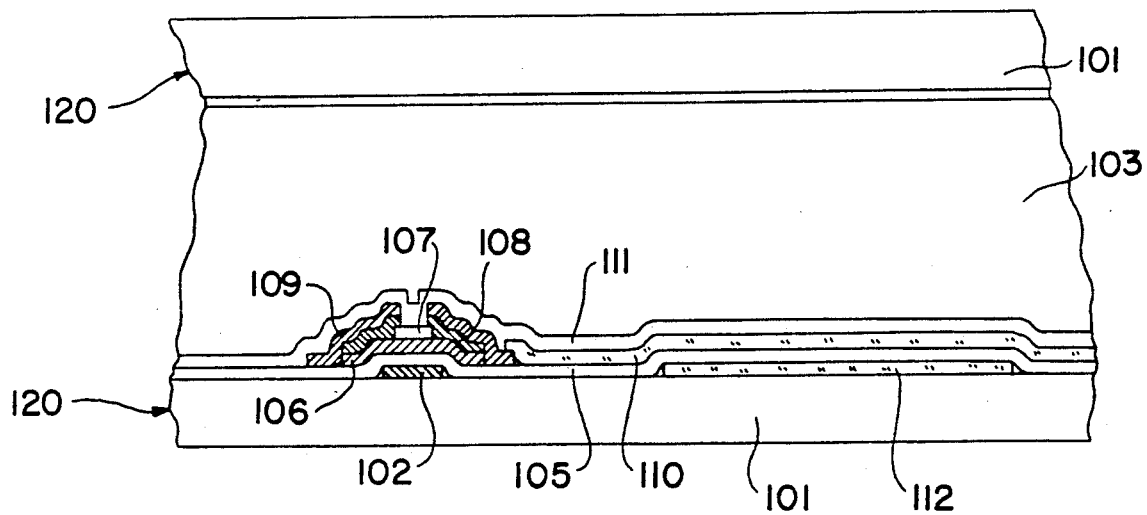

A liquid crystal active-matrix display device of this invention that uses reverse stagger type thin film transistors (TFTs) as addressing devices generally includes, as shown in FIG. 2, a pair of cell substrates 100 facing each other and liquid crystal 13 sealed in the space between the pair of cell substrates 100. One of the cell substrates 100 comprises an insulating substrate 1, gate electrodes 3, first insulating films 4, second insulating films 5, a-Si semiconducting films 6, third insulating films 7, n+-a-Si semiconducting films 8, drain electrodes 9, picture element electrodes 10, and passivation films 11.

Figure 1A:
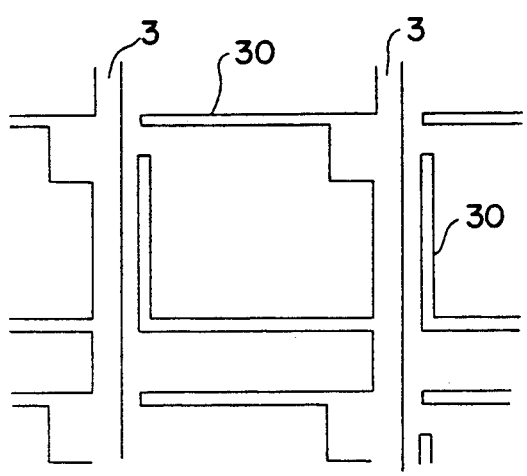
FIGS. 1a to 1c are plane views showing the production process of a liquid crystal active-matrix display device of this invention.
Figure 1B:
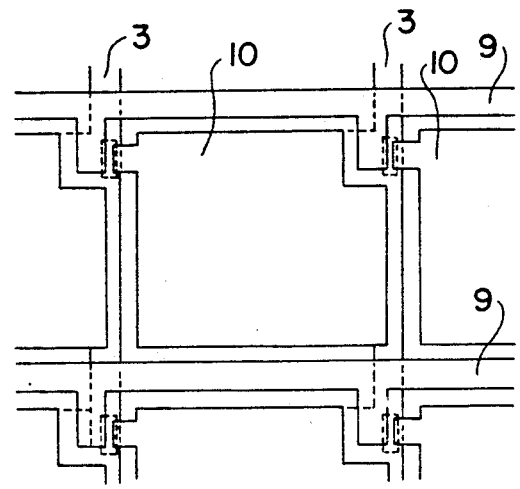
Figure 1C:
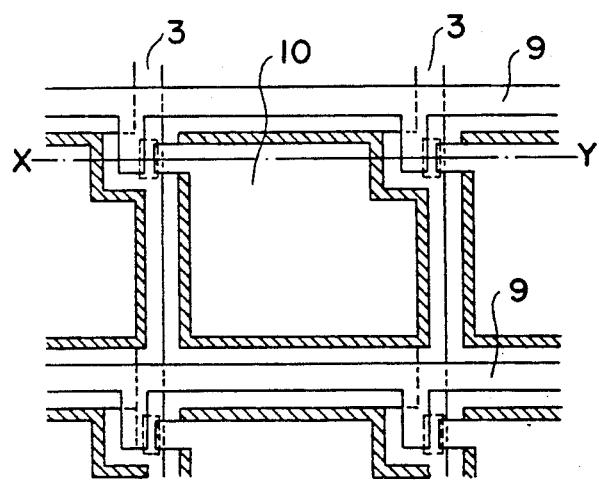
Figure 1D:
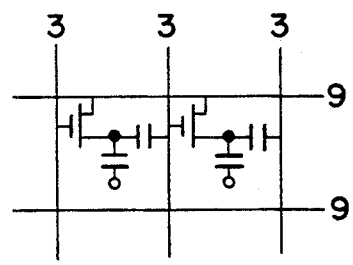
FIG. 1d is an equivalent circuit of the display device shown in FIG. 1c.

The liquid crystal active-matrix display device of this invention is manufactured as follows. As shown in FIGS. 1a to 1c, on an insulating substrate 1 made of glass, tantalum (Ta) is applied to a thickness of about 3000 Å by sputtering, and patternized by photolithography to form gate electrodes 3. These also function as additional-capacitor electrodes, at specified pitches on the same plane. Then, the Ta surface of each of the gate electrodes or additional-capacitor electrodes 3 is oxidized by anodic oxidation to form a first insulating film 4 of tantalum pentoxide $Ta_2O_5$ with a thickness of about 2000 Å. $Ta_2O_5$ presents a high dielectric constant, and is suitable for high capacity. Then, a second insulating film 5 with a thickness of about 2000 Å of silicon nitride SiNx is formed by plasma chemical vapor deposition over the entire surface of the substrate 1 so as to insulate the gate electrodes 3 from each other. Then, an a-Si film with a thickness of about 300 Å and an SiNx film with a thickness of about 2000 Å are successively formed over the entire surface of the substrate 1 and patternized by photolithography to form a first semiconducting film 6 of a-Si, which functions as a semiconducting film of TFTs, and a third insulating film 7 of SiNx on the semiconducting film 6. Then, an n+-a-Si film with a thickness of about 400 Å is formed by plasma chemical vapor deposition and patternized by photolithography to form a second semiconducting film 8. Thereafter, a metal film of Ti, Mo, W, or the like, that has a high melting point, is formed with a thickness of about 3000 Å by sputtering or electron-beam deposition and patternized by photolithography to form source and drain electrodes 9. A transparent conducting film that mainly contains indium oxide is formed with a thickness of about 1000 Å by sputtering or electron-beam deposition and patternized by photolithography to form picture element electrodes 10. The edge portion of each of the picture element electrodes 10 overlaps the edge portion of each of the gate electrodes 3 through the first and second insulating films 4 and 5, thereby resulting in additional capacitors that are indicated by the hatched areas of FIG. 1c.

Then, an SiNx passivation film 11 with a thickness of about 5000 Å is formed to cover the insulating films 5 and 7, the semiconducting film 8 and the electrodes 9 and 10 by plasma chemical vapor deposition, thereby resulting in a liquid crystal active-matrix display device with additional capacitors.

The gate electrode that overlaps a picture element electrode, so as to function as an additional-capacitor electrode is a gate electrode, that is adjacent to the gate electrode of the TFT for driving the picture elements formed by the picture element electrode.

As shown in FIG. 1a, each of the gate electrodes 3 can include a gate line 30, that extends from each of the gate electrodes 3, in such a manner that it is positioned to overlap the periphery of the corresponding picture element electrode 10.

The potential level of each of the additional-capacitor electrodes is preferably unchanged during a holding period (i.e., from the time when previous writing operation has been completed to the time when next writing operation begins). However, because the gate electrodes also function as additional-capacitor electrodes for the adjacent picture element electrode, a gate driving pulse is applied to the gate electrodes during the holding period when the adjacent picture element potential should be maintained at a certain level as determined by the writing operation. This pulse raises the picture element potential level through the additional capacitors, so that the operation point of the TFTs is shifted. The shift in the operation point of the TFTs takes place in the direction that the OFF bias of the TFTs becomes more negative, and electric charges stored in the additional capacitors do not flow out of the additional capacitors.

Although a voltage applied to the liquid crystal varies during the application of the gate driving pulse to the gate electrodes, the ratio of the gate driving pulse width to the holding period is as small as 1/the number of gate lines. This is so that the effect of the variation in the voltage to be applied to the liquid crystal is negligible.

The area where each of the picture element electrodes overlaps each of the gate electrodes is preferably located in a long, narrow strip fashion on the outskirts of the picture element electrodes. Thus, a decrease in the opening ratio of the picture element electrodes can be minimized. This construction is effective when the liquid crystal display device is driven in a normally white mode (i.e., a mode in which the display device exhibits white when no electric field is applied and the transmittance of the liquid crystal decreases with an increase in the voltage to be applied; for example, a twisted nematic display device with polarizers arranged in a cross-fashion). In a normally white mode, light leaks from the space between each picture element electrode and each gate line or each source line, which causes difficulties in attaining high contrast, so that a shading mask should be disposed on the color filter side. To secure an alignment margin between the TFT substrate and the color filter-sided substrate, the size of the picture element electrode is set to be larger than that of the opening formed for the shading mask in the color filter-sided substrate. Accordingly, when the additional capacitor are formed in the areas of the picture element electrodes that are positioned outside of the opening of the color filter, a decrease in the opening ratio of the display device can be minimized.

Although it is most preferable that both the gate line 30 of each of the gate electrodes 3 and the edge portion of each of the gate electrodes 3 overlap the edge portion of the corresponding picture element electrode 10, even when the edge portion of each gate electrode 3 alone overlaps the corresponding picture element electrode 10, the same effect as mentioned above can be attained.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid-crystal active-matrix display device comprising:
   picture element electrodes; and
   thin film transistors, each including a gate, source and drain electrode and each corresponding to one of said picture element electrodes, for switching voltages applied to each corresponding picture element electrode;
   said thin film transistors and corresponding picture element electrodes being arranged in a matrix format on a substrate;
   said thin film transistors being connected to gate lines and source lines at intersections thereof, the gate lines each connecting a plurality of said gate electrodes and the source lines each connecting a plurality of said source electrodes;
   said drain electrodes being connected to said picture element electrodes;
   said gate electrodes and non-corresponding adjacent picture element electrodes overlapping at edge portions thereof to form additional capacitors, with a first insulating film and a second insulating film being interposed therebetween.

2. A liquid-crystal active-matrix display device according to claim 1, wherein the gate electrodes are made of tantalum, the first insulating film is made of tantalum pentoxide the second insulating film is made of silicon nitride.

3. A liquid-crystal active-matrix display device according to claim 1, wherein each gate line is made in one piece connecting each corresponding gate electrodes, and wherein each source line is made in one piece connecting each corresponding source electrode.

4. A liquid crystal active-matrix display device according to claim 1, wherein the edge portion of the gate electrode which overlays the picture element electrode functions as an additional-capacitor electrode for an adjacent picture element electrode.

5. A liquid crystal active-matrix display device according to claim 1, wherein the first insulating film is an oxidized part of each gate electrode.

6. A liquid crystal active-matrix display device according to claim 1, wherein the second insulating film is a chemically vapor deposited part of the substrate.

7. A device, as claimed in claim 1, wherein said gate electrode is made of a non-transparent material.

8. A device, as claimed in claim 3, wherein each gate line overlaps the periphery of a plurality of adjacent picture element electrodes to thereby minimize light from leaking from each of said picture element electrodes.

9. A liquid crystal active-matrix display apparatus comprising:
   a plurality of parallel source lines disposed on a substrate in a first direction;
   a plurality of parallel gate lines disposed on said substrate in a second direction, perpendicular to said first direction;
   a plurality of thin film transistors, each including a gate, source, and drain electrode, disposed at intersections of said parallel gate lines and said parallel source lines;
   a plurality of picture element electrodes disposed on said substrate in a matrix fashion so as to each correspond to one of said plurality of thin film transistors, each of said thin film transistors witching applied voltages to drive each of said corresponding picture element electrodes;
   said gate electrodes, formed of a non-transparent material, of each of said transistors, and a non-corresponding adjacent picture element electrode overlapping at edge portions thereof to thereby form an additional capacitor electrode at said overlapped edge portions.

10. An apparatus, as claimed in claim 9, further comprising first and second insulating layers, separating each said overlapped edge portion of said picture element electrodes and gate electrodes.

11. An apparatus, as claimed in claim 10, wherein the gate electrodes are made of tantalum, the first insulating film is made of tantalum pentoxide, and the second insulating film is made of silicon nitride.

12. An apparatus, as claimed in claim 9, wherein each gate line is made in one piece connecting a plurality of corresponding gate electrodes, and wherein each source line is made in one piece connecting a plurality of corresponding source electrodes.

13. An apparatus, as claimed in claim 10, wherein the first insulating film is an oxidized part of each gate electrode.

14. An apparatus, as claimed in claim 10, wherein the second insulating film is a chemically vapor deposited part of the substrate.

15. An apparatus, as claimed in claim 12, wherein each gate line overlaps the periphery of a plurality of adjacent picture element electrodes to thereby minimize light from leaking from each of said picture element electrodes.

* * * * *

(12) EX PARTE REEXAMINATION CERTIFICATE (7669th)

United States Patent
Hamada et al.

(10) Number: US 5,028,122 C1
(45) Certificate Issued: Aug. 10, 2010

(54) LIQUID CRYSTAL ACTIVE-MATRIX DISPLAY DEVICE

(75) Inventors: Hiroshi Hamada, Nara (JP); Tadanori Hishida, Nara (JP); Ikuo Sakono, Osaka (JP)

(73) Assignee: Sharp Kabushiki Kaisha, Abeno-Ku, Osaka (JP)

Reexamination Request:
No. 90/007,455, Mar. 8, 2005
No. 90/007,717, Sep. 12, 2005

Reexamination Certificate for:
Patent No.: 5,028,122
Issued: Jul. 2, 1991
Appl. No.: 07/340,777
Filed: Apr. 20, 1989

(30) Foreign Application Priority Data

Apr. 20, 1988 (JP) .............................................. 63-98536

(51) Int. Cl.
G02F 1/13 (2006.01)
G02F 1/1362 (2006.01)

(52) U.S. Cl. ................................ 349/38; 349/46; 345/92
(58) Field of Classification Search ........................ None
See application file for complete search history.

(56) References Cited

U.S. PATENT DOCUMENTS

| | | | |
|---|---|---|---|
| 4,431,271 A | 2/1984 | Okubo | |
| 4,448,491 A | 5/1984 | Okubo | |
| 4,733,948 A * | 3/1988 | Kitahara | 349/111 |
| 4,752,814 A * | 6/1988 | Tuan | 257/60 |
| 4,843,438 A * | 6/1989 | Koden et al. | 257/59 |
| 4,955,697 A | 9/1990 | Tsukada et al. | 349/38 |
| 5,003,356 A | 3/1991 | Wakai et al. | |
| 5,028,551 A | 7/1991 | Dohyo et al. | |
| 5,075,674 A | 12/1991 | Katayama et al. | |
| 5,087,113 A | 2/1992 | Sakono et al. | |
| 5,146,301 A | 9/1992 | Yamamura et al. | |
| 5,231,039 A | 7/1993 | Sakono et al. | |
| 5,329,153 A * | 7/1994 | Dixit | 257/530 |
| 5,753,540 A * | 5/1998 | Wu et al. | 438/131 |

FOREIGN PATENT DOCUMENTS

| | | |
|---|---|---|
| GB | 2 118 774 A | 2/1983 |
| JP | 58-106860 | 12/1981 |
| JP | 58-106860 | 6/1983 |
| JP | 60-57959 | 9/1983 |
| JP | 60-230118 | 4/1984 |
| JP | 59-141271 | 8/1984 |
| JP | S61-170724 | 1/1985 |
| JP | 60-57959 | 4/1985 |
| JP | S61-235820 | 4/1985 |
| JP | 60-230117 | 11/1985 |
| JP | 60-230118 | 11/1985 |
| JP | 61-029820 | 2/1986 |
| JP | 61-116872 | 6/1986 |
| JP | 61-151516 | 7/1986 |
| JP | 61-170724 | 8/1986 |
| JP | 61-235820 | 10/1986 |

(Continued)

OTHER PUBLICATIONS

Article by Ikeda et al., "SiO$_x$/TaO$_x$ Gate Insulator a–Si TFT for Liquid Crystal Displays," *Japanese Journal of Applied Physics*, vol. 26 No. 9, pp. 1565–1567, (1987).

"A 6×6 Inch 20 Lines–per–Inch Liquid–Crystal Display Panel", IEEE Transactions on Electron Devices, vol. ED–20, No. 11, Nov. 1973, Brody et al., pp. 995–1001 (1973).

(Continued)

*Primary Examiner*—Erik Kielin

(57) ABSTRACT

A liquid crystal active-matrix display device is disclosed in which the edge portion of each of the gate electrodes overlaps the edge portion of each of the picture element electrodes to form an additional capacitor. The gate electrodes are made of tantalum, and a first insulating film of tantalum pentoxide and a second insulating film of silicon nitride are disposed in a gap between each of the gate electrodes and each of the picture element electrodes. This thereby provides additional capacitors with a large capacity at a high yield, with little affect on other processes.

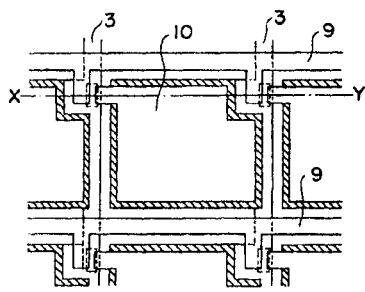
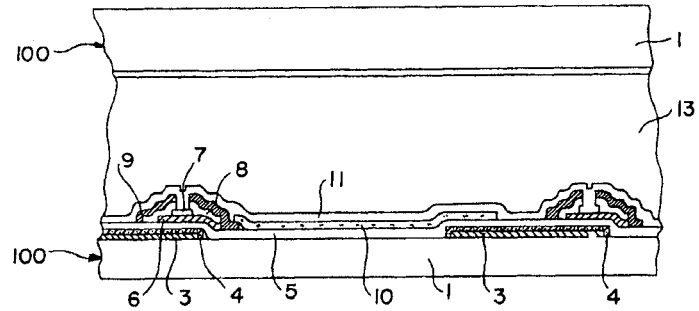

FOREIGN PATENT DOCUMENTS

| JP | S-62-44717 | 2/1987 |
|---|---|---|
| JP | 62-044717 | 2/1987 |
| JP | 62-066666 | 3/1987 |
| JP | 62-223727 | 10/1987 |
| JP | 63-70832 | 3/1988 |
| JP | 63-181472 | 7/1988 |
| JP | 63-210823 | 9/1988 |
| JP | 64-26822 | 1/1989 |
| JP | 1-169433 | 7/1989 |

OTHER PUBLICATIONS

1978 SID International Symposium, "Alphanumeric and Video Performance of a 6"×6" 30 Lines–Per–Inch Thin–Film Transistor–Liquid Crystal Display Panel", Luo et al., (3pgs) (1978).

1982 SID International Symposium, "Hybrid Processed TFT Matrix Circuits for Flat Display Panels", Luo et al. (3pgs) (1982).

Xerox Disclosure Journal, vol. 9, No. 4, Jul./Aug. 1984, "Storage Capacitors In a TFT Addressed Liquid Crystal Display Panel", Luo, pp. 261–262 (1984).

"Active–Matrix Techniques for Displays", Howard, Proceedings of the SID, vol. 27/4 (pp. 313–326) (1986).

"$SiO_x/TaO_x$ Gate Insulator a–Si TFT for Liquid Crystal Displays", Ikeda et al., Japanese Journal of Applied Physics, vol. 26, No. 9, Sep. 1987, (5pgs) (1987).

1988 International Display Research Conference, "An Amorphous Si TFT Array With TaOx/SiNx Double Layered Insulator for Liquid Crystal Displays", Takeda et al., (4pgs) (1988).

"10.5 Electrooptical Performance of a TFT–Addressed TNLC Panel", F. Morin, Japan Display (1983).

"Design of Thin Film Transistors for Matrix Addressing of Television Liquid Crystal Displays" Stroomer, Philips Research Laboratories, Eindhoven, The Netherlands.

Report of Expert Webster E. Howard, PH.D., Re: U.S. Patent No. 5,1028,122 dated Mar. 16, 2005.

Rebuttal Expert Report of Aris K. Silzars, Ph.D., dated Apr. 7, 2005.

Deposition of Webster E. Howard, Ph.D., Apr. 20, 2005.

Videotaped Deposition of Aris K. Silzars, Ph.D., Apr. 25, 2005.

Notice of Motion and Motion for Partial Summary Judgment; Defendants' Memorandum of Points and Authorities in Support of Motion, filed May 6, 2005.

Sharp Corporation's Memorandum in Opposition to Defendants' Motion for Partial Summary Judgment (filed May 20, 2005).

Reply Brief in Support of Defendants' Motion for Partial Summary Judgment, filed May 27, 2005 (redacted version).

Declaration of Aris K. Silzars, Ph.D., in Support of Sharp's Opposition to Defendants' Motion for Partial Summary Judgment, dated May 19, 2005 (redacted version).

Order Denying in Part and Continuing in Part Defendants' Motions for Partial Summary Judgment, filed Jun. 20, 2005.

Order Construing Claims, dated Aug. 19, 2004.

Opposition to Plaintiff's Motion for Partial Summary Judgment on Defendants' Counterclaims and Affirmative Defenses of Patent Unenforceability, filed May 20, 2005.

Oral Hearing Transcript, re Jun. 10, 2005 hearing in N.D. Calif. (C.A. No. C03–4244 MMC).

"Active Matrix Substrate", Miyazawa, Mar. 1987 (English Translation of JP–62–066666).

Article by Luo, F.C. et al., "15.3: A 640×400 CdSE TFT–LC Display Panel," *SID International Symposium Digest of Technical Papers vol. XVI*, pp. 286–288, (1985).

Article by Luo, F.C. et al., "7.7/4:40 P.M.: Hybrid Processed TFT Matrix Circuits for Flat Display Panels," *SID International Symposium Digest of Technical Papers vol. XIII*, pp. 46–47, (1982).

\* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-15 are cancelled.

\* \* \* \* \*